US006517046B1

(12) United States Patent
Boecking

(10) Patent No.: US 6,517,046 B1
(45) Date of Patent: Feb. 11, 2003

(54) FUEL INJECTION VALVE

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 09/787,145

(22) PCT Filed: Jul. 13, 2000

(86) PCT No.: PCT/DE00/02276

§ 371 (c)(1),
(2), (4) Date: Jun. 18, 2001

(87) PCT Pub. No.: WO01/06112

PCT Pub. Date: Jan. 25, 2001

(30) Foreign Application Priority Data

Jul. 14, 1999 (DE) .......................................... 199 32 764

(51) Int. Cl.[7] .......................... F02M 51/06; F16K 31/02
(52) U.S. Cl. ................................ 251/129.06; 239/102.2
(58) Field of Search .................. 251/129.06; 239/102.2, 239/585.1; 310/328

(56) References Cited

U.S. PATENT DOCUMENTS 3,360,664 A * 12/1967 Straube ...................... 310/330
4,662,564 A * 5/1987 Okuda ......................... 239/73
4,728,074 A * 3/1988 Igashira et al. ............... 251/57
4,927,084 A * 5/1990 Brandner et al. ... 251/129.06 X
5,394,852 A * 3/1995 McAlister ................... 123/494
6,043,587 A * 3/2000 Jaenker ...................... 310/353
6,140,745 A * 10/2000 Bryant ....................... 310/353
6,262,519 B1 * 7/2001 Furlani et al. .............. 310/358

FOREIGN PATENT DOCUMENTS

| | | |
|---|---|---|
| DE | 38 00 203 | 7/1989 |
| DE | 197 45 468 | 4/1999 |
| JP | 62 121 860 | 3/1987 |

* cited by examiner

*Primary Examiner*—Henry C. Yuen
*Assistant Examiner*—Eric Keasel
(74) *Attorney, Agent, or Firm*—Kenyon & Kenyon

(57) ABSTRACT

A fuel injection valve, in particular an injection valve for fuel injection systems of internal combustion engines, has a valve closing body that can be activated by an activation device with the aid of a valve needle, the valve closing body interacting with a valve seat surface to produce a sealing seat, and the activation device having at least one piezo-electric first bending element for producing a valve needle lift of the valve needle, the first bending element bending when the activation device is activated. In this context, the bending element is made of a plurality of piezo elements stacked in a longitudinal direction of the first bending element, internal electrodes arranged between the piezo elements being oriented perpendicular to the longitudinal direction of the bending element.

14 Claims, 3 Drawing Sheets

FUEL INJECTION VALVE

RELATED ART

The present invention starts from a fuel injection valve according to the type of the main claim.

A fuel injection valve having a valve closing body that can be activated by an activation device by means of a valve needle and that interacts with a valve seat surface to produce a seat is known from German Patent 38 00 203 C2. In this case the activation device for producing a valve needle lift has two piezoelectric bending elements that bend when the activation device is activated. In this context the bending elements are oriented in their longitudinal direction perpendicular to the direction of movement of the valve closing body. Each of the activating elements has a ceramic plate arranged between two conductive films. The ceramic plate and the conductive films are thus stacked in the direction of movement of the valve closing body. To activate the activation device, a voltage applied between the conductive films acts on the ceramic plate causing the ceramic plate to bend. The bending is transmitted to the valve needle via a stop disk causing the valve closing body to lift away from the valve seat surface and the seat to open. A greater valve needle lift can be produced by stacking bending elements, which are arranged so that they bend convexly or concavely relative to one another.

In the fuel injection valve known from German Patent 38 00 203 C2, it is disadvantageous that the ceramic plate and the conductive films are layered one above the other in the direction of movement of the valve closing body, as a result of which each bending element only produces a small valve needle lift and only a small force can be applied for opening the valve needle. A very large number of stacked bending elements is therefore necessary to achieve an appropriate valve needle lift.

A further disadvantage is that the bending elements have a central bore through which the valve needle projects, so that when the bending elements are activated, high bending stresses occur in the central area of the bending elements, thereby limiting the valve needle lift attainable by the bending elements. Moreover, during extremely frequent activation of the fuel injection valve, high frictional forces are produced in the area of the central bore due to the friction between the valve needle and the bending elements, the insulating films being required at the same time to be electrically insulated from one another. The fuel injection valve proposed in German Patent 38 00 203 C2 is therefore expensive to manufacture and cannot be used as a quick-switching fuel injection valve or as a high-pressure fuel injection valve.

From Japanese Patent Application 62-121 860 A, a fuel injection valve having two bending elements arranged parallel to a valve axis is known. As in German Patent 38 00 203 C2, the bending elements are made of layers arranged parallel to a substrate.

ADVANTAGES OF THE PRESENT INVENTION

By contrast, the fuel injection valve of the present invention having the characterizing features of the main claim has the advantage that a large lift is produced by the piezo elements stacked in a longitudinal direction of the bending element. Moreover, the fuel injection valve of the present invention can also be used as a quick-switching fuel injection valve and/or as a high-pressure fuel injection valve.

Advantageous developments of the fuel injection valve indicated in the main claim are possible by implementing the measures cited in the subclaims.

The activation device advantageously has a piezoelectric second bending element made of a plurality of piezo elements stacked in the longitudinal direction of the second bending element, the two bending elements being arranged staggered with respect to one another. This enables the valve needle's lift produced by the activation device to be increased.

It is furthermore advantageous if, when the activation device is activated, the second bending element bends in the opposite direction to the first bending element. This makes it possible to economize on additional support assemblies and intermediate plates.

It is advantageous if the activation device has a tie rod that connects the bending elements to the valve needle by friction. By this means the activation device acts on the valve needle without adversely affecting the function of the bending elements. It is also advantageous if the valve needle is surrounded at least in sections by a valve needle sleeve and for the valve needle sleeve to have an attachment surface to which the tie rod is attached via a welded joint. Thus, a simple conformation of the attachment is achieved. Advantageously, the tie rod encloses the bending elements and the free ends of the tie rod are connected to the valve needle or the valve needle sleeve.

Advantageously, the bending elements in a starting position are oriented essentially parallel to a valve axis, resulting in an installation-favorable variant.

Furthermore, it is advantageous if the bending elements for acting upon the seat are bent relative to one another with an initial tension in a closed position of the fuel injection valve. This makes it possible to economize on additional components. The initial tension can also be reinforced by an initial tension element, in particular a spring steel strip.

DRAWINGS

Exemplary embodiments of the present invention are shown in the drawings in simplified form and explained in more detail in the subsequent description.

DESCRIPTION OF EXEMPLARY EMBODIMENTS

Figure 1:
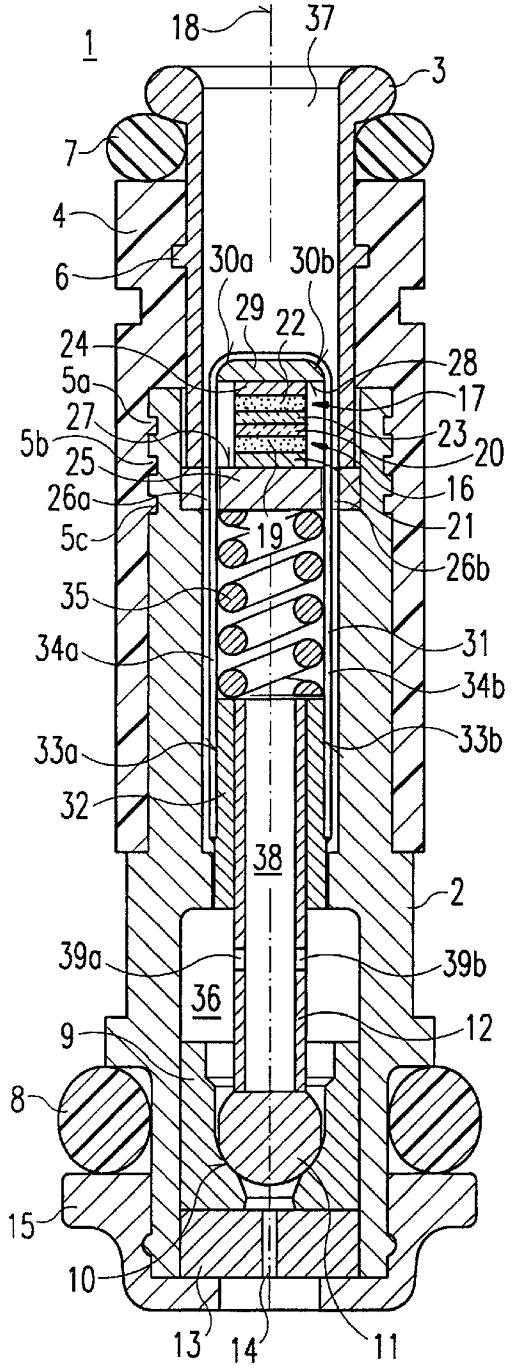
FIG. 1 shows an axial section through a first exemplary embodiment of a fuel injection valve of the present invention.

FIG. 1 shows a fuel injection valve 1 of the present invention in a simplified axial sectional view. Fuel injection valve 1 is used in particular for the direct injection of fuel, in particular gasoline, into a combustion chamber of an internal combustion engine with mixture-compression spark ignition as a so-called gasoline direct-injection valve. However, fuel injection valve 1 of the present invention is also suitable for other applications, in particular for injecting fuel into an intake manifold of the internal combustion engine.

Fuel injection valve 1 has a valve seat holder 2 connected to a fuel intake connecting piece 3. Valve seat holder 2 and fuel intake connecting piece 3 are surrounded by a plastic jacket 4 at least in sections, plastic jacket 4 together with valve seat holder 2 forming a housing of fuel injection valve 1. Plastic jacket 4 is preferably sprayed around valve seat holder 2 and fuel intake connecting piece 3. In order to produce a connection having positive engagement between valve seat holder 2 and plastic jacket 4 or between fuel intake connecting piece 3 and plastic jacket 4, circumferential grooves 5*a*–5*c* are provided in valve seat holder 2, and a circumferential collar 6 is provided in fuel intake connecting piece 3. Fuel injection valve 1 has sealing rings 7, 8 in order to guarantee a leak-proof coupling of fuel injection valve 1 to external devices.

In the interior of valve seat holder 2, a valve seat body 9 is arranged that has a valve seat surface 10 that interacts with a valve closing body 11 to produce a sealing seat. In the exemplary embodiment shown, valve closing body 11 is formed in the shape of a partial sphere and is connected to a tubular, internally hollow valve needle 12. Valve seat body 9 lies adjacent to a spray plate 13 that has a spray channel 14 through which fuel is sprayed into the combustion chamber of the internal combustion engine when fuel injection valve 1 is activated. Valve seat body 9 and spray plate 13 are connected to valve seat holder 2 with positive engagement. At the seat end of valve seat holder 2, a holding element 15 is attached to support sealing ring 8, which likewise represents a protective cap.

Fuel injection valve 1 is activated via a first bending element 16 and a second bending element 17, which are stacked on top of one another in the direction of a valve axis 18. First bending element 16 has a piezoelectric layer 19 situated between a ceramic substrate 20 and a plate 21. Second bending element 17 has a piezoelectric layer 22 situated between a ceramic substrate 23 and a plate 24.

Figure 3:
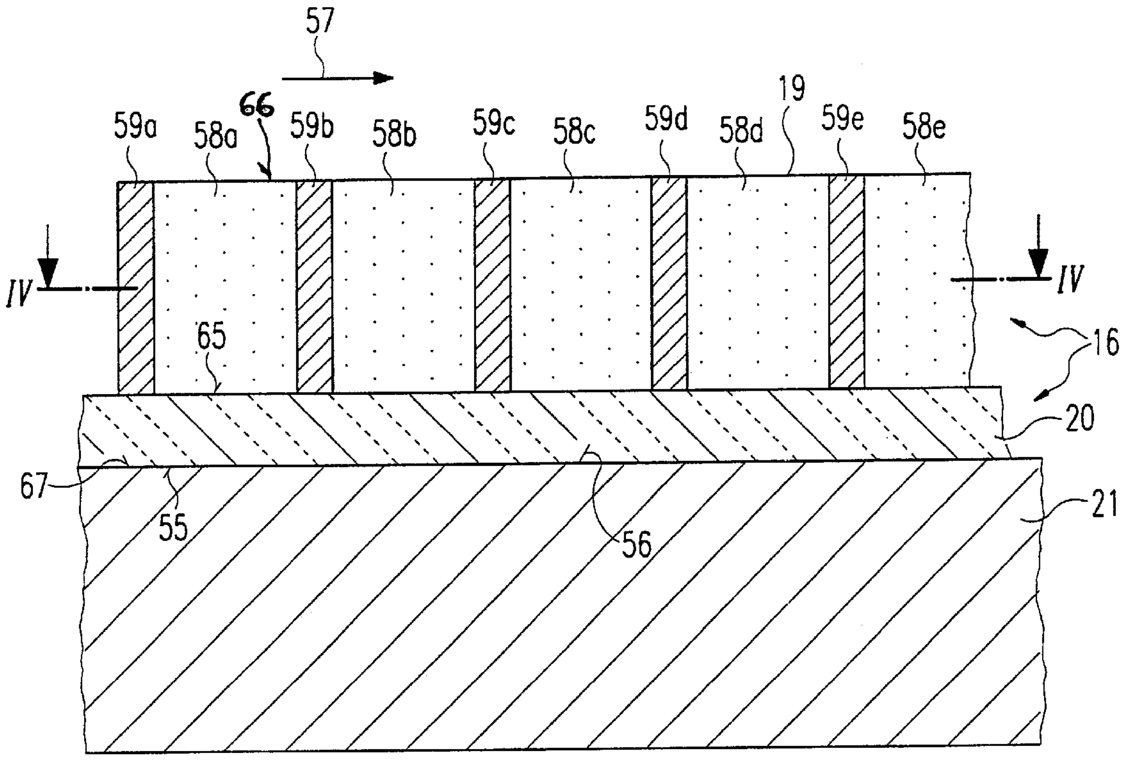
FIG. 3 shows a detail of the fuel injection valve of the present invention.
Figure 4:
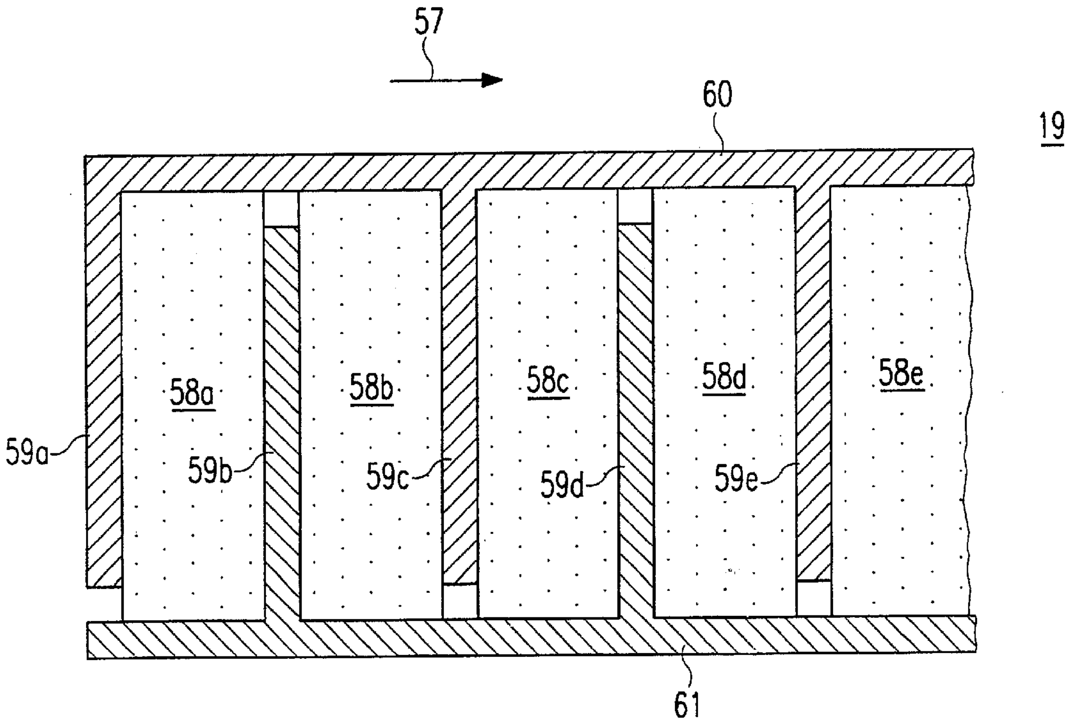
FIG. 4 shows a section along the section line designated IV—IV in FIG. 3.

Plates 21, 24 are preferably manufactured from electrically insulating material and can also be formed using an electrically insulating film. Ceramic substrate 20 is connected firmly to piezoelectric layer 19 of first bending element 16 and ceramic substrate 23 is connected firmly to piezoelectric layer 22 of second bending element 17. The detailed construction of bending elements 16, 17 is shown in FIGS. 3 and 4 and is explained in more detail in the description pertaining to these Figures.

First bending element 16 is supported via plate 21 on a base plate 25 connected firmly to valve seat holder 2, base plate 25 having opening 26*a*, 26*b*, and plate 21 lying just adjacent to an upper surface 27 of base plate 25 when the activation device is in the inactivated state.

When the activation device is in the inactivated state, plate 24 of the second bending element 17 lies just adjacent to a lower surface 28 of a pressure plate 29. Pressure plate 29 has rounded edges 30*a*, 30*b* on which a tie rod 31 runs over pressure plate 29. Tie rod 31 is attached to a valve needle sleeve 32. Valve needle sleeve 32 has attachment surfaces 33*a*, 33*b* for this purpose, at which tie rod 31 is welded to valve needle sleeve 32. Valve needle sleeve 32 surrounds valve needle 12 in sections on the side facing away from valve closing body 11, and is connected to valve needle 12 by positive engagement. The connection can be made, for example, by a force fit. In the view shown in FIG. 1, tie rod 31 is U-shaped, the two free ends 34*a*, 34*b* of tie rod 31 being attached to attachment surfaces 33 of valve needle sleeve 32. Alternatively, tie rod 31 can also be attached directly to valve needle 12, or else can act on valve needle 12 only via a suitable device.

A pressure spring 35 is arranged between the two free ends 34*a*, 34*b* of tie rod 31, which extend in an axial direction, the pressure spring 35 being supported on the one side against base plate 25 and on the other side against valve needle sleeve 32. In this case pressure spring 35 is acted upon by an initial tension, so that valve closing body 11 is pressed via valve needle 12 into valve seat surface 10 of valve seat body 9, in order to form a sealing seat and thus to prevent the outflow of fuel from a fuel chamber 36 into spray channel 14. In this case the fuel is fed from fuel intake connecting piece 3 into fuel chamber 36 via an inner longitudinal aperture 37 of fuel intake connecting piece 3, openings 26*a*, 26*b* of base plate 25 and an inner opening 38 of valve needle 12, which is connected to fuel chamber 36 via transverse bores 39*a*, 39*b*. The fuel feed from fuel intake connecting piece 3 in the direction of the sealing seat formed from valve closing body 11 and valve seat surface 10 is explained in simplified form in the exemplary embodiment shown.

To activate the activation device, bending elements 16, 17 are acted upon by an electrical voltage. When first bending element 16 is acted upon by the electrical activating voltage, piezoelectric layer 19 expands in the longitudinal direction of first bending element 16 oriented perpendicular to valve axis 18, ceramic substrate 20 not experiencing any expansion. Since piezoelectric layer 19 is connected firmly to ceramic substrate 20, first bending element 16 is curved concavely relative to second bending element 17. Likewise, second bending element 17, when acted upon by an electrical voltage, is curved concavely relative to first bending element 16.

The curvature of bending elements 16, 17 can be reversed when bending elements 16, 17 are acted upon by a reversed voltage. A reversal can also be achieved by exchanging bending elements 16, 17. In this case bending elements 16, 17 lie adjacent to plates 21, 24, and ceramic substrates 20, 23 lie adjacent to pressure plate 29 or base plate 25 respectively.

To produce an axial lift of the movement device, it is advantageous if either the edge of bending elements 16, 17 moves so that bending elements 16, 17 are curved convexly relative to one another when a voltage is applied and support one another in the central area, or else that the movement takes place in the central area of bending elements 16, 17 so that bending elements 16, 17 are curved concavely relative to one another and are respectively supported against one another at the edge.

According to the present invention, a single bending element 16 can also be used or further bending elements can be provided in order to achieve a greater lift of the activation device.

The lift of the activation device is transmitted to valve needle 12 via tie rod 31, so that valve closing body 11 lifts away from valve seat surface 10 of valve seat body 9 and releases the sealing seat, as a result of which fuel travels from fuel chamber 36 into spray channel 14 and is injected from there. Tie rod 31 is not deformed when the activation device is activated, so that it also is not exposed to any related load.

Figure 2:
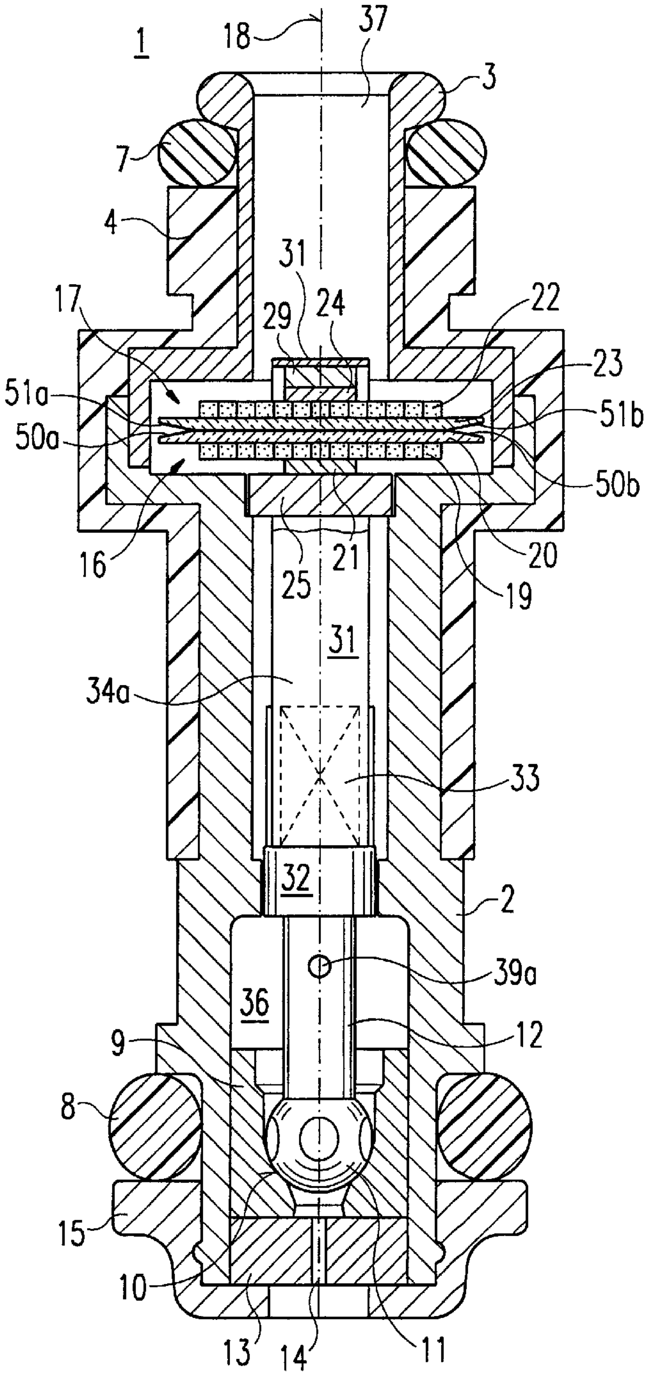
FIG. 2 shows an axial section through the exemplary embodiment of the fuel injection valve of the present invention shown in FIG. 1 with a sectional direction transverse to FIG. 1.

The fuel injection valve 1 represented in FIG. 2 shows the fuel injection valve 1 represented in FIG. 1 in a view rotated 90° with respect to valve axis 18. Already described elements are provided with matching reference numbers in all Figures, so that a repeated description is unnecessary.

As can be recognized in detail from FIG. 2, the first bending element 16 is made of a ceramic substrate 20 and a piezoelectric layer 19 applied thereon, the layer 19 being made of a plurality of piezo elements stacked in the longitudinal direction of the first bending element 16 and having internal electrodes arranged between the piezo elements and oriented perpendicular to the longitudinal direction of the bending element. In this case the longitudinal direction of the first bending element 16 is oriented perpendicular to valve axis 18. The second bending element 17 is constructed correspondingly. When the first bending element 16 is activated, piezoelectric layer 19 expands and since it is connected to ceramic substrate 20, first bending element 16 is warped, being supported with its ends 50*a*, 50*b* against ends 51*a*, 51*b* of the second bending element 17 and with its center against plate 21. When piezoelectric layer 22 of second bending element 17 is acted upon by a voltage, piezoelectric layer 22 connected to ceramic substrate 23 expands, causing second bending element 17 to bend. In this case second bending element 17 is supported at its ends 51*a*, 51*b* against first bending element 16 and at its center against plate 24. The lift produced by the two bending elements 16, 17 is transmitted to tie rod 31 via pressure plate 29. Since tie rod 31 is connected to valve needle sleeve 32 at attachment surface 33, the lift of bending elements 16, 17 is transmitted to valve closing body 11.

In order to reduce the wear of ceramic substrates 20, 23, ends 50*a*, 50*b* of ceramic substrate 20 and ends 51*a*, 51*b* of ceramic substrate 23 can be rounded. Bending elements 16, 17 can also be incorporated into fuel injection valve 1 such that piezoelectric layers 19, 22 are supported against one another and ceramic substrate 20 or 23 is supported on plate 21 or 24, respectively. For this purpose it is advantageous if plates 21, 24 extend over the entire longitudinal direction of bending elements 16, 17. When bending elements 16, 17 are activated, bending elements 16, 17 are then advantageously supported having their ends 50*a*, 50*b* and 51*a*, 51*b* against plates 21 and 24.

FIG. 3 shows a detail of fuel injection valve 1 of the present invention in a sectional view. First bending element 16 is made of a piezoelectric layer 19 that is firmly connected to a ceramic substrate 20. Ceramic substrate 20 lies with its underside 55 on the upper side 56 of plate 21. Bending element 16 is made of a plurality of piezo elements 58*a* through 58*e* stacked in a longitudinal direction 57 of first bending element 16, internal electrodes 59*a* through 59*e* arranged between piezo elements 58*a* through 58*e* being oriented perpendicular to longitudinal direction 57 of bending element 16.

In FIG. 4 the section, designated IV in FIG. 3, through piezoelectric layer 19 of bending element 16 is shown. Internal electrodes 59*a* through 59*e* are stacked between piezo elements 58 stacked in longitudinal direction 57. Piezo elements 58*a* through 58*e* are stacked in longitudinal direction 57 between internal electrodes 59*a* through 59*e* oriented perpendicular to longitudinal direction 57. Internal electrodes 59*a*, 59*c*, 59*e* are connected to a first external electrode 60. Internal electrodes 59*b*, 59*d* are connected to a second external electrode 61. When a voltage is applied between first external electrode 60 and second external electrode 61, piezo elements 58*a* through 58*e* are acted upon by an electrical field, causing them to contract or expand, depending on the orientation of the piezoelectric material of piezo elements 58*a* through 58*e*. Advantageously, internal electrodes 59*a* through 59*e* are connected alternately in longitudinal direction 57 to the first external electrode 60 and the second external electrode 61. As a result, either all piezo elements 58*a* through 58*e* expand in longitudinal direction 57 or they contract in longitudinal direction 57, the expansion of piezo elements 58*a* through 58*e* being added to produce a lift of piezoelectric layer 19.

The piezoelectric layer 19 represented in FIG. 3 is connected to ceramic substrate 20 at a connection surface 65. When piezoelectric layer 19 is acted upon by an electrical voltage, the layer expands, the expansion not taking place uniformly, but rather being smaller in the area of connection surface 65 than in the area of the upper side surface of piezoelectric layer 19. As a result the first bending element 16 is bent, partially lifting away from upper side 56 of plate 21 and being supported on an edge surface 67 of plate 21.

Figure 5:
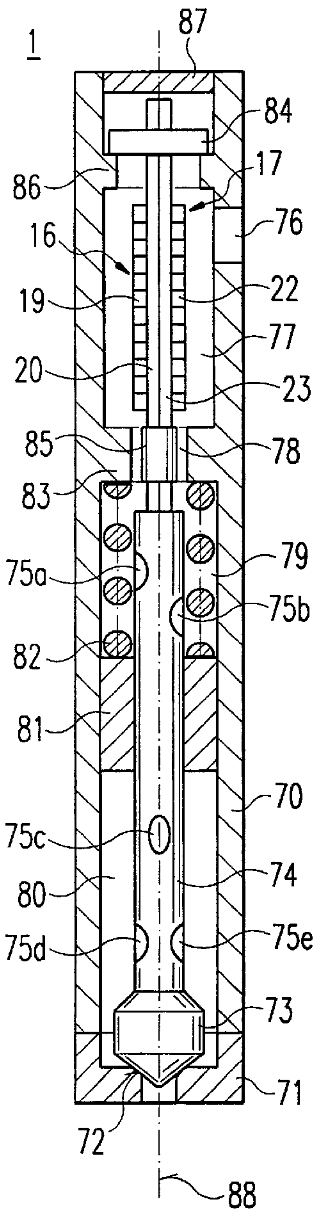
FIG. 5 shows an axial section through a second exemplary embodiment of the fuel injection valve of the present invention in the resting state.

FIG. 5 shows a second exemplary embodiment of fuel injection valve 1 of the present invention in an axial sectional view.

Fuel injection valve 1 has a valve housing 70 connected to a valve seat body 71. A valve seat surface 72 is formed on valve seat body 71, the surface 72 interacting with a valve closing body 73 to produce a sealing seat. Valve closing body 73 is connected to a tubular valve needle 74, which has fuel apertures 75*a*–75*e* for the conveying-through of fuel. The fuel is fed via a fuel intake connecting piece 76 arranged laterally on valve housing 70 into a first inner chamber 77 of fuel injection valve 1 and from there via an aperture 78 into a second inner chamber 79. The fuel is conducted from inner chamber 79 via apertures 75*a*–75*e* and the internal aperture of valve needle 74 into a third inner chamber 80.

A tubular valve needle sleeve 81 surrounds valve needle 74 in sections and is connected firmly to valve needle 74. A pressure spring 82 is supported on the one side on a collar 83 of valve housing 70 and on the other side on valve needle sleeve 81. As a result, valve closing body 73 is pressed against valve seat surface 72.

Fuel injection valve 1 is activated via an activation device that has first bending element 16 and second bending element 17. In this exemplary embodiment, bending elements 16, 17 are connected at one end to a spring element 84 and at their other end to valve needle 74. Moreover, bending elements 16, 17 are surrounded by a sleeve 85. Spring element 84 is supported on a collar 86 formed on valve housing 70, against the force of pressure spring 82. Bending elements 16, 17 are held together at their ends by means of spring element 84 and sleeve 85. On the side of bending elements 16, 17, valve housing 70 is sealed using a plate 87.

Figure 6:
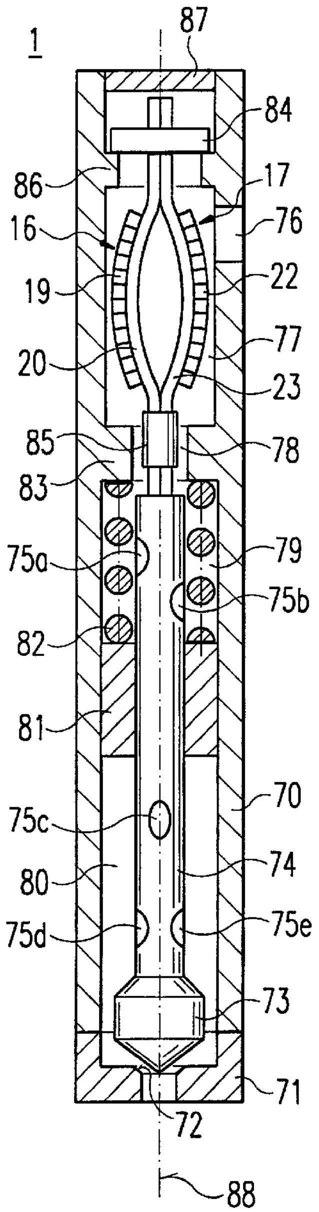
FIG. 6 shows an axial section through the second exemplary embodiment of the fuel injection valve of the present invention in the activated state.

FIG. 6 shows the second exemplary embodiment of fuel injection valve 1 of the present invention when the activation device is activated. Ceramic substrate 20 of first bending element 16 lies flat against ceramic substrate 23 of second bending element 17. When the two bending elements 16, 17 are activated, piezoelectric layers 19, 22 expand, as a result of which bending elements 16, 17 bend concavely relative to one another. This gives the configuration shown in FIG. 6.

First bending element 16 is bent concavely relative to second bending element 17, bending elements 16, 17 being held together at their edge by spring element 84 and sleeve 85 and lifting away from one another in the center. As a result, a lift of valve needle 74 is produced in the direction of valve axis 88, so that valve closing body 73 lifts away from valve seat surface 72 of valve seat body 71 and releases the sealing seat.

Figure 7:
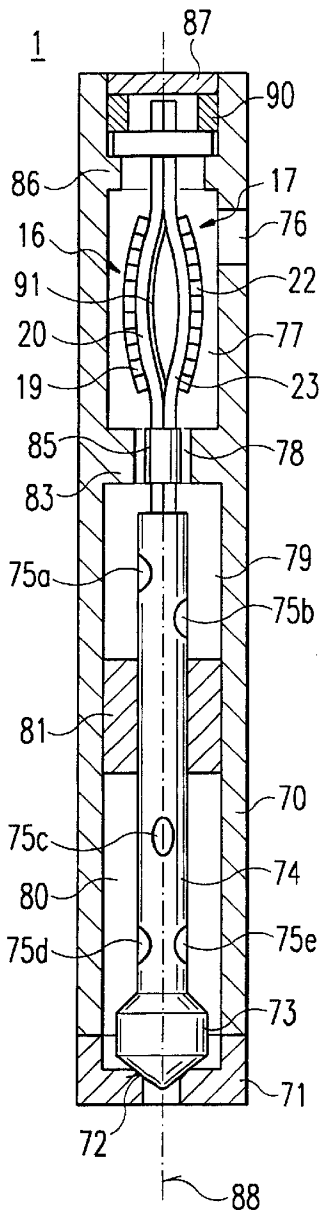
FIG. 7 shows an axial section through a third exemplary embodiment of the fuel injection valve of the present invention.

FIG. 7 shows a third exemplary embodiment of fuel injection valve 1 of the present invention in an axial sectional view.

In this exemplary embodiment, spring element 84 is attached to an additional support element 90 on collar 86 of valve housing 70. Bending elements 16, 17 of the activation device are bent relative to one another with a moderate bending when fuel injection valve 1 is in the closed position. As a result, the sealing seat formed by valve closing body 73 and valve seat surface 72 is acted upon by an initial tension. In order to increase this initial tension, at least one initial tension element 91 can be provided, which in this exemplary embodiment is connected to the first bending element 16. An initial tension element 91 can also be provided that is situated between the two bending elements 16, 17 and undergoes elastic deformation in the axial direction. Initial tension element 91 can be formed in particular as a spring steel strip. It can also be electrically insulated from bending elements 16, 17. To open fuel injection valve 1, the activation device is acted upon by a voltage, causing bending elements 16, 17 to bend even more strongly against one another and the sealing seat is opened. In order to avoid valve needle chatter of valve needle 74, it is advantageous for bending elements 16, 17 to be supported against valve housing 70 of fuel injection valve 1 via spring element 84.

The present invention is not limited to the exemplary embodiments described. In particular, the present invention is also suitable for an externally opening fuel injection valve 1. In this case bending elements 16, 17 in the exemplary embodiment according to FIGS. 1 and 2 can also be acted upon via a connection having positive engagement.

What is claimed is:

1. A fuel injection valve, comprising:

a valve needle;

an activation device including at least one piezoelectric first bending element for producing a lift in the valve needle, wherein:

the at least one piezoelectric first bending element bends when the activation device is activated;

a valve closing body that can be activated by the activation device in accordance with an operation of the valve needle; and a valve seat surface for interacting with the valve closing body to produce a sealing seat, wherein the at least one piezoelectric first bending element includes:

a plurality of piezo elements stacked in a longitudinal direction of the at least one piezoelectric first bending element, and a plurality of internal electrodes arranged between the plurality of piezo elements and oriented perpendicular to the longitudinal direction of the at least one piezoelectric first bending element.

2. The fuel injection valve according to claim 1, wherein:

the fuel injection valve corresponds to an injection valve for a fuel injection system of an internal combustion engine.

3. The fuel injection valve according to claim 1, wherein:

the activation device includes a piezoelectric second bending element, the piezoelectric second bending element includes another plurality of piezo elements stacked in a longitudinal direction of the piezoelectric second bending element, and the at least one piezoelectric first bending element and the piezoelectric second bending element are arranged staggered with respect to one another.

4. The fuel injection valve according to claim 3, wherein:

when the activation device is activated, the piezoelectric second bending element bends in a bending direction that is opposite to a bending direction of the at least one piezoelectric first bending element.

5. The fuel injection valve according to claim 3, wherein:

the at least one piezoelectric first bending element and the piezoelectric second bending element in a starting position are oriented essentially perpendicular to a valve axis.

6. The fuel injection valve according to claim 3, wherein:

the activation device includes a tie rod that connects the at least one piezoelectric first bending element and the piezoelectric second bending element to the valve needle by friction.

7. The fuel injection valve according to claim 6, further comprising:

a valve needle sleeve that surrounds the valve needle at least in sections, wherein:

the valve needle sleeve includes attachment surfaces to which the tie rod is attached.

8. The fuel injection valve according to claim 7, wherein:

the tie rod is attached to the valve needle sleeve by a welded joint.

9. The fuel injection valve according to claim 7, wherein:

the tie rod clasps the at least one piezoelectric first bending element and the piezoelectric second bending element, and free ends of the tie rod are connected to one of the valve needle and the valve needle sleeve.

10. The fuel injection valve according to claim 3, wherein:

the at least one piezoelectric first bending element and the piezoelectric second bending element in a starting position are oriented essentially parallel to a valve axis.

11. The fuel injection valve according to claim 10, wherein:

the at least one piezoelectric first bending element and the piezoelectric second bending element, for acting upon the sealing seat with an initial tension, are bent relative to one another in a closed position of the fuel injection valve.

12. The fuel injection valve according to claim 11, wherein:

the activation device includes an initial tension element.

13. The fuel injection valve according to claim 12, wherein:

the initial tension element includes a spring steel strip.

14. The fuel injection valve according to claim 10, further comprising:

a valve housing; and a spring element, wherein:

the at least one piezoelectric first bending element and the piezoelectric second bending element are supported against the valve housing via the spring element.

* * * * *

UNITED STATES PATENT AND TRADEMARK OFFICE
CERTIFICATE OF CORRECTION

PATENT NO. : 6,517,046 B1
DATED : February 11, 2003
INVENTOR(S) : Friedrich Boecking It is certified that error appears in the above-identified patent and that said Letters Patent is hereby corrected as shown below:

Column 1,
Line 3, change “RELATED ART” to -- FIELD OF THE INVENTION --
Line 4, change “starts from” to -- relates to --
Line 5, delete “according to the type of the main claim”
Line 5, insert “BACKGROUND INFORMATION”
Lines 9, 27 and 28, change “known from German Patent 38 00 203 C2” to -- described in German Patent No. 38 00 203 --
Line 47, change “German Patent 38 00 203 C2” to -- German Patent No. 38 00 203 --
Line 51, change “From Japanese Patent Application 62-121 860A,” to -- Japanese Laid-Open Patent Application No. 62-121 860 describes --
Lines 53-54, change “German Patent 38 00 203 C2” to -- German Patent No. 38 00 203 --
Line 53, delete “is known”
Line 56, change “ADVANTAGES” to -- SUMMARY --
Line 58, delete “having the characterizing features of the main claim”
Line 65, delete “Advantageous developments of the fuel injection valve”
Line 66, delete “indicated in the main claim are possible by implementing the”
Line 67, delete “measures cited in the subclaims.”

Column 2,
Line 36, change “DRAWINGS” to -- BRIEF DESCRIPTION OF THE DRAWINGS --
Line 38, delete “Exemplary embodiments of the present invention are”
Line 39, delete “shown in the drawings in simplified form and explained in”
Line 40, delete “more detail in the subsequent description”
Lines 43,47, 49 51 and 54, change “;” to -- . --
Line 57, change “; and” to -- . --
Line 62, change “DESCRIPTION” TO -- DETAILED DESCRIPTION --

UNITED STATES PATENT AND TRADEMARK OFFICE

CERTIFICATE OF CORRECTION

PATENT NO. : 6,517,046 B1
DATED : February 11, 2003
INVENTOR(S) : Friedrich Boecking It is certified that error appears in the above-identified patent and that said Letters Patent is hereby corrected as shown below:

Column 6,
Line 50, change "means" to -- way --

Signed and Sealed this

Seventeenth Day of August, 2004

Jon W. Dudas

JON W. DUDAS
*Acting Director of the United States Patent and Trademark Office*